US012524544B2

(12) United States Patent
Merchant et al.

(10) Patent No.: US 12,524,544 B2
(45) Date of Patent: Jan. 13, 2026

(54) DETECTING AND PREVENTING HARMFUL GENERATIVE IMAGE OUTPUTS USING DIGITAL SIGNATURES

(71) Applicant: Microsoft Technology Licensing, LLC, Redmond, WA (US)

(72) Inventors: Meenaz Aliraza Merchant, Kirkland, WA (US); Sudharsan Prabu, Kirkland, WA (US); Kun Wu, Bellevue, WA (US); Surendra Ulabala, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 18/394,607

(22) Filed: Dec. 22, 2023

(65) Prior Publication Data
US 2025/0209172 A1    Jun. 26, 2025

(51) Int. Cl.
*G06F 21/56* (2013.01)
*G06F 21/55* (2013.01)
*G06N 3/0475* (2023.01)

(52) U.S. Cl.
CPC .......... *G06F 21/566* (2013.01); *G06F 21/554* (2013.01); *G06N 3/0475* (2023.01); *G06F 2221/034* (2013.01)

(58) Field of Classification Search
CPC ................. G06F 21/566; G06F 21/554; G06F 2221/034; G06N 3/0475
See application file for complete search history.

(56) References Cited

U.S. PATENT DOCUMENTS 12,107,885 B1 * 10/2024 Kawasaki ................ G06N 3/08
12,130,917 B1 * 10/2024 Yeung ..................... G06F 21/56
(Continued)

FOREIGN PATENT DOCUMENTS

KR        20250060045 A  *  5/2025  ............ G06V 40/16
WO   WO-2024033607 A1 *  2/2024  ........... G06F 21/566
(Continued)

OTHER PUBLICATIONS

Hamadene et al, Deepfake Signatures Detection in the Handcrafted Space, 2023 IEEE/CVF International Conference on Computer Vision Workshops (ICCVW), p. 460-466 (Year: 2023).*

*Primary Examiner* — Christopher A Revak
(74) *Attorney, Agent, or Firm* — Ray Quinney & Nebeker P.C.; Christopher K. Hallstrom

(57) ABSTRACT

This disclosure describes utilizing an image model protection system to improve the defensive robustness of a large generative image model against the generation of harmful digital images. For example, the image model protection system uses digital signatures of identified harmful images to determine whether a particular harmful image was generated by a specific large generative image model. Using digital signatures, the image model protection system matches the harmful image to images generated by the large generative image model. The image model protection system then identifies the prompt used to generate the image at the large generative image model. Furthermore, the image model protection system uses the harmful prompt to implement new security measures to safeguard the large generative image model against the generation of similar harmful images in the future.

20 Claims, 9 Drawing Sheets

(56) References Cited

U.S. PATENT DOCUMENTS

| | | | |
|---|---|---|---|
| 12,282,545 B1* | 4/2025 | Narayanaswamy | ... G06N 20/00 |
| 2021/0319240 A1* | 10/2021 | Demir | .................... G06V 40/40 |
| 2024/0056458 A1* | 2/2024 | Lee | ...................... G06N 3/0475 |
| 2024/0370654 A1* | 11/2024 | Pedder | .................... G06F 40/30 |
| 2025/0039234 A1* | 1/2025 | Southgate | ........... H04L 63/1483 |
| 2025/0068741 A1* | 2/2025 | Lafon | .................. G06F 21/577 |
| 2025/0139229 A1* | 5/2025 | Mathur | .................. G06N 3/047 |
| 2025/0150474 A1* | 5/2025 | Jones | ........................ G06N 3/08 |
| 2025/0225277 A1* | 7/2025 | Morris | ................ G06F 21/6254 |

FOREIGN PATENT DOCUMENTS

| | | | | |
|---|---|---|---|---|
| WO | WO-2024213987 A1 * | 10/2024 | ............. | G06N 20/00 |
| WO | WO-2025089665 A1 * | 5/2025 | ........... | H04N 21/431 |
| WO | WO-2025166011 A1 * | 8/2025 | ............. | G06F 40/30 |

\* cited by examiner

DETECTING AND PREVENTING HARMFUL GENERATIVE IMAGE OUTPUTS USING DIGITAL SIGNATURES

BACKGROUND

The landscape of computational devices has experienced significant advancements in both hardware and software domains, particularly in the implementation of generative artificial intelligence (AI) models for task execution, including the generative image creation field. The increased proficiency of large generative image models has resulted in their widespread integration across numerous systems and applications. However, several vulnerabilities still persist within generative AI models, including large image generation models, making them susceptible to targeting by malicious entities.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
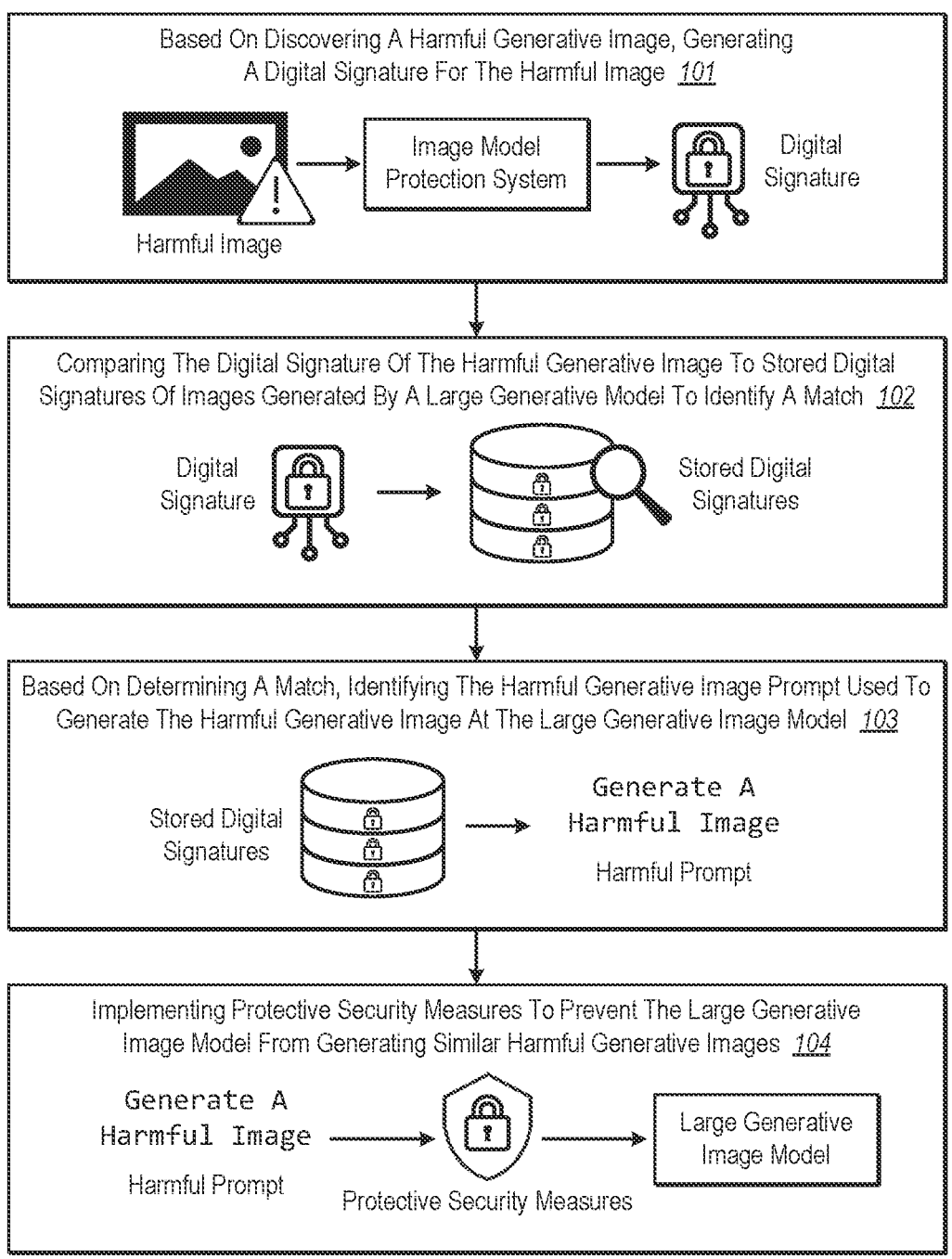
FIG. 1 illustrates an example overview of the image model protection system implementing protective security measures to prevent a large generative image model from generating harmful generative images using digital signatures.

This disclosure describes utilizing an image model protection system to improve the defensive robustness of a large generative image model against the generation of harmful digital images. For example, the image model protection system uses digital signatures of identified harmful images to determine whether a particular harmful image was generated by a specific large generative image model. Using digital signatures, the image model protection system matches the harmful image to images generated by the large generative image model. The image model protection system then identifies the prompt used to generate the image at the large generative image model. Furthermore, the image model protection system uses the harmful prompt to implement new security measures to safeguard the large generative image model against the generation of similar harmful images in the future.

Implementations of the present disclosure provide benefits and solve problems in the art with systems, computer-readable media, and computer-implemented methods that utilize an image model protection system that implements improved protective security measures for large generative image models to prevent the generation of harmful generative images. As described below, the image model protection system creates and leverages digital signatures to uncover harmful prompts used for creating harmful images using a large generative image model and implement security measures to prevent, prohibit, or inhibit the large generative image model from generating similar harmful images.

To elaborate, in various implementations, the image model protection system receives a generative image generated by a large generative image model. In some cases, a generative image is a harmful generative image (harmful image) that uses a harmful generative image prompt (harmful prompt) to evade the security measures of the large generative image model. In response to receiving a generative image, the image model protection system generates a digital signature and stores it in a data store having stored digital signatures associated with images generated by the large generative image model.

In some implementations, the image model protection system identifies an image as a harmful generative image. In these implementations, the image model protection system generates a digital signature for the harmful generative image. In addition, the image model protection system determines whether the large generative image model generated the harmful image by correlating the digital signature of the harmful image to the stored digital signatures in the data store. If the large generative image model generated the harmful image, the image model protection system will identify a matching stored digital signature. In these instances, the image model protection system uses the stored digital signature to identify the harmful prompt used to generate the harmful image. Additionally, the image model protection system uses the harmful prompt to implement protective security measures to prevent the large generative image model from generating similar harmful images.

As described in this disclosure, the image model protection system delivers several significant technical benefits in terms of improved computing security, accuracy, and efficiency compared to existing systems that utilize large generative image models. Moreover, the image model protection system provides several practical applications that address problems related to detecting and preventing harmful generative image prompts from subverting security measures, policies, and guardrails of large generative image models.

To elaborate, the image model protection system provides improved security over existing systems by identifying harmful prompts that are associated with harmful images generated by a large generative image model. For example, using an identified harmful prompt, the image model protection system generates and implements improved security measures to prevent similar harmful prompts from causing the large generative image model to generate harmful images. Indeed, the image model protection system provides resilience against repeat harmful prompt attacks and allows large generative image models to be updated to robustly protect against these attacks, such as from bad actors that seek to exploit weak model barriers to manipulate, misuse, and cause them to generate harmful generative images.

In various implementations, by using digital signatures, the image model protection system improves the accuracy of detecting harmful images. In one or more implementations, the image model protection system maintains an internal copy of the digital signature that is unavailable for outside parties to view or access. By maintaining an internal copy, the image model protection system prevents bad actors from identifying the digital signature and applying changes until the digital signatures no longer match. Instead, the image model protection system more accurately identifies matches to images generated by the model that bad actors leave unaltered or with nominal changes. This way, each generative image is traceable back to the large generative image model and prompt from which it was generated.

In some implementations, the image model protection system can link a harmful image to the large generative image model from which it was generated using the digital signature even if the image has been modified. For example, in various instances, the image model protection system utilizes a fuzzy hash algorithm (or a similar algorithm) to generate a digital signature of a generative image. A fuzzy hash algorithm allows an image to be modified, to an extent, and still maintain the same digital signature.

In some implementations, the image model protection system determines whether the digital signature of a harmful image matches only one digital signature of millions or billions of stored digital signatures based on comparing the digital signatures in a vector space. For example, the image model protection system compares the embedding of the digital signature of a harmful image to stored digital signature embeddings to determine an image match. In additional implementations, the image model protection system combines unique seeding data with a generative image prompt, which causes the large generative image model to create a unique generative image having a distinct digital signature. This allows the image model protection system to accurately identify a digital signature as a match because of its distinctness, even among billions of other stated digital signatures. This also allows for improved search efficiency by reducing the number of computational operations needed to identify a matching digital signature.

In various implementations, the image model protection system improves security and accuracy by detecting multiple harmful prompts from a single harmful image. For example, upon identifying a first harmful prompt, the image model protection system may identify other stored harmful prompts that share one or more attributes, such as a common period of time, a common request address, and/or a common user identifier. The image model protection system can use these additional harmful prompts to further fortify the large generative image model against harmful attacks.

As illustrated in the foregoing discussion, this disclosure utilizes a variety of terms to describe the features and advantages of one or more implementations described. To illustrate, this disclosure describes the image model protection system in the context of a cloud computing system.

As an example, a "large generative model" (LGM) is a large artificial intelligence system that uses deep learning and a large number of parameters (e.g., in the billions or trillions) that are trained on one or more vast datasets to produce fluent, coherent, and topic-specific outputs (e.g., text and/or images). In many instances, a generative model refers to an advanced computational system that uses natural language processing, machine learning, and/or image processing to generate coherent and contextually relevant human-like responses.

Large generative models have applications in natural language understanding, content generation, text summarization, dialog systems, language translation, creative writing assistance, image generation, audio generation, and more. A single large generative model often performs a wide range of tasks based on receiving different inputs, such as prompts (e.g., input instructions, rules, example inputs, example outputs, and/or tasks), data, and/or access to data. In response, the large generative model generates various output formats ranging from one-word answers to long narratives, images and videos, labeled datasets, documents, tables, and presentations.

Moreover, large generative models are primarily based on transformer architectures to understand, generate, and manipulate human language. LGMs can also use a recurrent neural network (RNN) architecture, long short-term memory (LSTM) model architecture, convolutional neural network (CNN) architecture, or other architecture types. Examples of LGMs include generative pre-trained transformer (GPT) models including GPT-3.5 and GPT-4, bidirectional encoder representations from transformers (BERT) model, text-to-text transfer transformer models such as T5, conditional transformer language (CTRL) models, and Turing-NLG. Other types of large generative models include sequence-to-sequence models (Seq2Seq), vanilla RNNs, and LSTM networks.

As an example, the term "large generative image model" refers to an LGM that generates digital images from input prompts, such as text or audio input. As another example, the term "large language model" (LLM) refers to a text-based version of an LGM, such as an LGM that receives text prompts and/or generates text outputs. In various implementations, an LGM is a multi-modal generative model that receives multiple input formats (e.g., text, images, video, data structures) and/or generates multiple output formats.

As an example, the term "generative image prompt" (image prompt) refers to a request provided to a large generative image model to create a generative image based on the plain language guidance in the image request. In some instances, the image model protection system forwards an image prompt request from a user to the large generative image model. In some instances, the image model protection system modifies the user image prompt, such as by adding a unique seed and/or expanding the user prompt to be more descriptive.

As another example, the term "harmful generative image prompt" (harmful prompt) refers to an image generation request designated to cause the large generative image model to create a harmful image that circumvents security measures, evades guardrails, and/or violates policies of the large generative image model. In various implementations, a harmful generative image prompt is a prompt that creates a generative image that is considered harmful. In some implementations, a malicious actor provides a harmful prompt. In some implementations, an innocent user provides a harmful prompt that is misunderstood by the large generative image model and generates a harmful image.

As an example, the term "generative image" refers to an image generated by the large generative image model based on an image prompt. As another example, the term "harmful generative image" (harmful image) refers to an image generated by the large generative image model based on a harmful generative image prompt. For example, a harmful image includes inappropriate content that violates the policies of the large generative image model.

As another example, the term "digital signature" refers to a unique label or tag associated with a generative image that indicates the large generative image model that generated the generative image. For example, upon receiving a generative image, the image model protection system generates a digital signature verifying the origin and authenticity of the generative image. The digital signature also includes whether a generative image has been modified. While digital signatures are unique, in various implementations, they can be matched when a generative image has been modified, to an extent. In one or more implementations, a digital signature is created with a method that cannot be reversed to recreate the generative image from which it was created (e.g., a non-reversible hash).

Additionally, as an example, a "network" refers to one or more data links that enable electronic data transport between computer systems, modules, and/or other electronic devices. A network may include public networks such as the Internet as well as private networks. When information is transferred or provided over a network or another communications connection (either hardwired, wireless, or a combination of hardwired or wireless) to a computer, the computer views the connection as a transmission medium. Transmission media can include a network and/or data links that can be used to carry the needed program code means in the form of computer-executable instructions or data structures and which can be accessed by a general-purpose or special-purpose computer. Combinations of the above are also included within the scope of computer-readable media.

Implementation examples and details of the image model protection system are discussed in connection with the accompanying figures, which are described next. For example, FIG. 1 illustrates an example overview of the image model protection system implementing protective security measures to prevent a large generative image model from generating harmful generative images using digital signatures according to some implementations. While FIG. 1 provides a high-level overview of the invention, additional details are provided in subsequent figures.

FIG. 1 illustrates a series of acts 100 performed by or with the image model protection system. As shown, the series of acts 100 includes act 101 of generating a digital signature for a harmful generated image based on discovering the harmful image. For example, the image model protection system receives a notification regarding a harmful generative image potentially generated by the large generative image model of an image generation system. In some instances, the image model protection system monitors various sources for the presence of harmful generative images created with large generative image models. Upon identifying the harmful image, the image model protection system generates its digital signature, which is further described below.

As shown, act 102 includes comparing the digital signature of the harmful generated image to stored digital signatures of images generated by a large generative image model to identify a match. For instance, for all images generated by a large generative image model, the image model protection system generates digital signatures and stores them in a private data store. When a harmful generated image is identified, the image model protection system compares its digital signature to the stored digital signatures to determine if a match exists, meaning that the large generative image model generated the harmful generative image. Otherwise, the image model protection system determines that the harmful image has been significantly altered since being generated or that another large generative image model likely generated the harmful image.

Act 103 includes identifying the harmful generative image prompt used to generate the harmful generative image in the large generative image model. After determining that the harmful generative image matches a stored digital signature, the image model protection system identifies other stored information associated with the stored digital signature. For example, the image model protection system identifies an image identifier associated with or linked to the stored digital signature and/or the harmful user prompt that causes the large generative image model to generate the harmful generative image (e.g., the harmful generative image prompt).

As shown, act 104 includes implementing protective security measures to prevent the large generative image model from generating similar harmful generative images. For instance, the image model protection system generates various security measures based on the harmful prompt to prevent the large generative image model from generating similar harmful prompts. Additional details regarding improving the security of the large generative image model using robustness measures are provided below in connection with FIG. 6.

Figure 2:
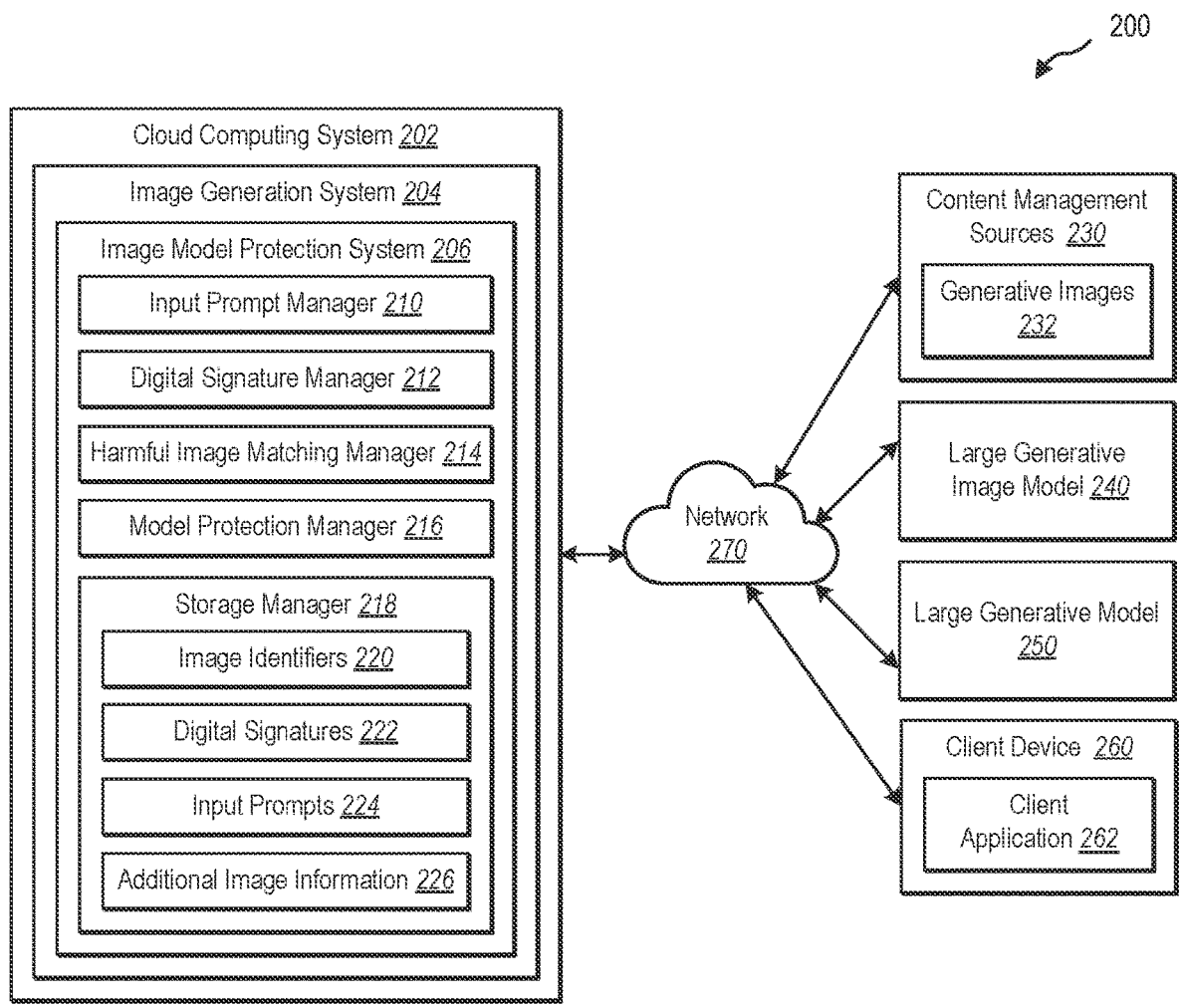
FIG. 2 illustrates an example computing environment where the image model protection system is implemented.

With a general overview in place, additional details are provided regarding the components, features, and elements of the image model protection system. To illustrate, FIG. 2 shows an example computing environment where the image model protection system is implemented according to some implementations. In particular, FIG. 2 illustrates an example of a computing environment 200 of various computing devices associated with an image model protection system 206. While FIG. 2 shows example arrangements and configurations of the computing environment 200, the image model protection system 206, and associated components, other arrangements and configurations are possible.

As shown, the computing environment 200 includes a cloud computing system 202 associated with the image model protection system 206, content management sources 230 with generative images 232, a large generative image model 240, a large generative model 250, and a client device 260 with a client application 262, connected via a network 270. Many of these components may be implemented on one or more computing devices, such as on one or more server devices. Some of these components may be implemented on a personal device. Further details regarding computing devices are provided below in connection with FIG. 9, along with additional details regarding networks, such as the network 270 shown.

Before describing components of the cloud computing system 202, including the image model protection system 206, other components of the computing environment 200 are first discussed. As shown, the cloud computing system 202 includes the content management sources 230 with the generative images 232. In various implementations, the content management sources 230 manage various digital content items including generative images 232. For example, the content management sources 230 include articles, blogs, forums, content sharing, social media, and other online content management sites that provide access to digital content items. Content management sources 230 may also include other digital content stores that maintain or provide access to digital content items.

As shown, the computing environment 200 includes the large generative image model 240, which creates generative images based on input prompts. In some instances, the large generative image model 240 generates harmful generative images based on harmful generative image prompts that evade its security measures. In various implementations, the image model protection system 206 provides a prompt to the large generative image model 240 that includes a user image generation request or other prompt language based on the user request. Additionally, the image model protection system 206 may implement measures provided by the image model protection system 206 to improve its security.

The computing environment 200 includes the large generative model 250, which creates generative outputs, such as text responses, based on prompt inputs. In some implementations, the image model protection system 206 utilizes the large generative model 250 to determine whether an image request prompt is harmful based on the context of previous harmful prompts. The image model protection system 206 may use the large generative model 250 for a variety of generative tasks. For example, in some instances, the image model protection system 206 uses the large generative model 250 to modify a user prompt before providing it to the large generative image model 240.

As shown, the computing environment 200 includes the client device 260. In various implementations, the client device 260 is associated with a user (e.g., a user client device), such as a user who uses a large generative image model 240 via the cloud computing system 202 to create generative images. For example, the client device 260 includes a client application 262, such as a web browser, mobile application, or another form of computer application for accessing and/or interacting with the cloud computing system 202 and/or large generative image model 240. In some instances, the user is a threat actor that provides harmful prompts to cause the large generative image model to generate harmful generative images.

Returning to the cloud computing system 202, as shown, the cloud computing system 202 includes an image generation system 204, which provides users with generative images. In various implementations, the image generation system 204 uses the large generative image model 240 to create generative images. For example, the image generation system 204 passes user prompts (with or without modifications) to the large generative image model 240 and returns the generative images to requesting user devices (e.g., the client device 260).

As shown, the image generation system 204 implements the image model protection system 206. In some implementations, the image model protection system 206 is located on a separate computing device from the image generation system 204 within the cloud computing system 202 (or apart from the cloud computing system 202). In various implementations, the image generation system 204 operates without the image model protection system 206.

As mentioned earlier, the image model protection system 206 improves protective measures against harmful prompts seeking to evade the security measures of the large generative image model 240. As shown, the image model protection system 206 includes various components and elements, which are implemented in hardware and/or software. For example, the image model protection system 206 includes an input prompt manager 210, a digital signature manager 212, a harmful image matching manager 214, a model protection manager 216, and a storage manager 218. The storage manager 218 includes image identifiers 220, digital signatures 222, input prompts 224, and additional image information 226.

As mentioned above, the image model protection system 206 includes the input prompt manager 210, which manages receiving, accessing, and handling user generative image requests that will be provided to the large generative image model 240 as input prompts 224 (including harmful generative image prompts). The image model protection system 206 also includes the digital signature manager 212, which generates digital signatures 222 for generated images created by the large generative image model 240. The digital signature manager 212 also generates digital signatures for harmful generative images identified by the image model protection system 206.

The digital signature manager 212 and/or the image model protection system 206 can store the digital signatures 222 in a data store. In some implementations, the image model protection system 206 stores digital signatures from multiple large generative image models in a data store. Likewise, in one or more implementations, the image model protection system 206 stores images generated by one or more large generative image models in the same or a different data store, which may also be the same or different data store used to store the digital signatures.

The image model protection system 206 includes the harmful image matching manager 214, which matches digital signatures 222 of harmful generative images to stored versions of the digital signatures 222 of images generated by the large generative image model 240. In some instances, the harmful image matching manager 214 also stores the generative image created by the image generation system 204. For example, for generative images created using the image generation system 204, the harmful image matching manager 214 stores the digital signatures 222, the input prompts 224, and additional image information 226 (e.g., unique randomized tokens), along with their corresponding image identifiers (each generative image is assigned a unique image identifier that is associated with any information stored with the image).

As shown, the image model protection system 206 includes the model protection manager 216, which implements improved protective security measures for the large generative image model 240 to prevent the generation of harmful generative images. Additional details regarding the implementation of protective security measures for a large generative image model are provided in FIG. 6 below.

Figure 3:
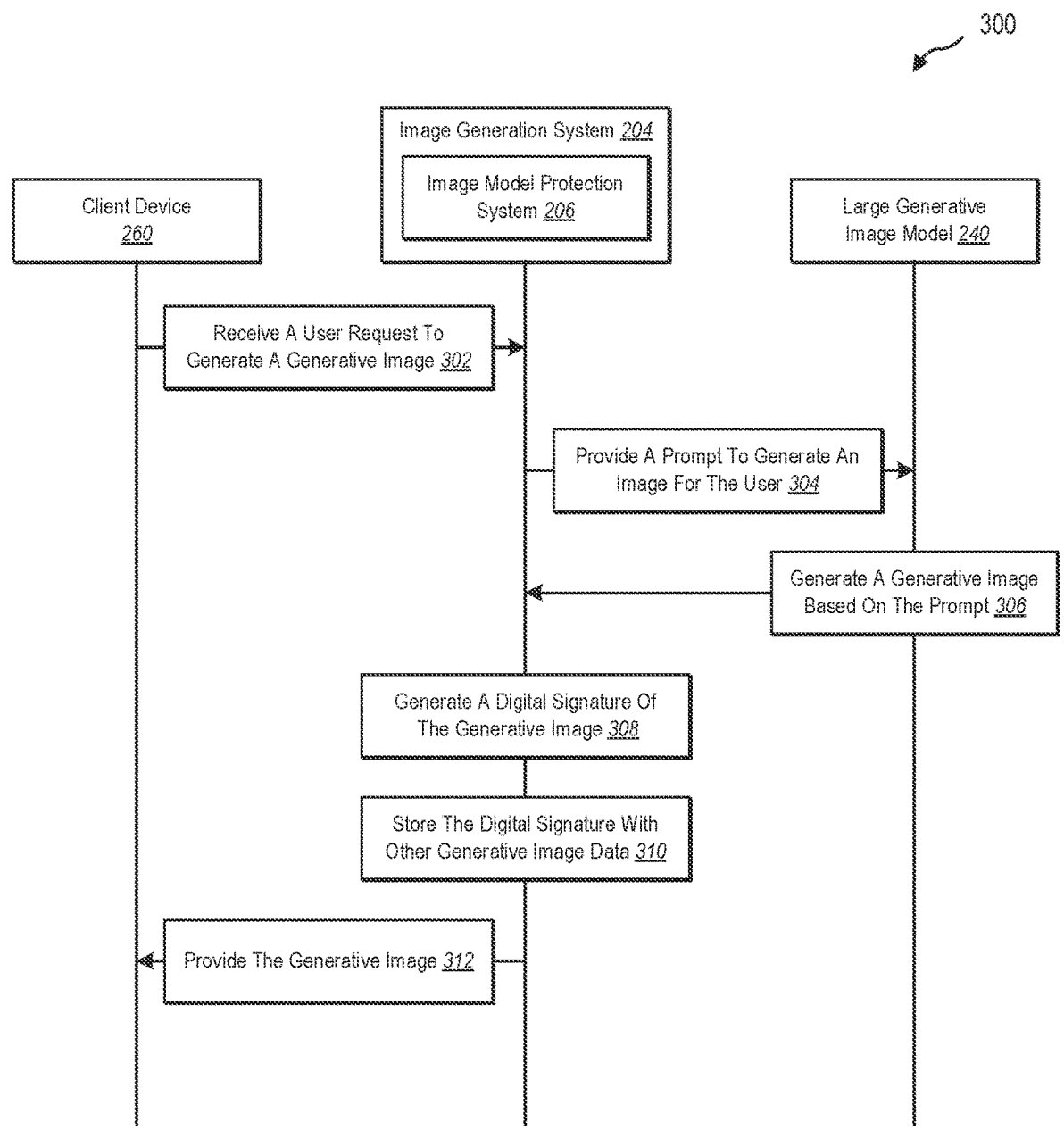
FIG. 3 illustrates an example sequence diagram of generating and storing digital signatures for generative images created by a large generative image model.

Turning to the next figure, FIG. 3 illustrates an example of using the image generation system and the image model protection system 206 to create generative images for users. FIG. 3 illustrates an example sequence diagram of generating and storing digital signatures for generative images created by a large generative image model according to some implementations. In some implementations, the image model protection system 206 generates a digital signature for all generative images created by the large generative image model.

As shown, FIG. 3 includes various components in communication with each other, including the image generation system 204, the image model protection system 206, the large generative image model 240, and the client device 260, each of which is introduced above. FIG. 3 also includes a series of acts 300 performed by or with the image model protection system 206 for generating and storing generative images.

As shown, the series of acts 300 includes act 302 of the image generation system 204 receiving a user request to generate a generative image. For example, the client device 260 provides a user generative image request to the image generation system 204 that includes a description of an image the user would like generated. Often, the user request is via text, but in some instances, it is through audio, menu selections, or another type of input.

Based on receiving the user generative image request, the image generation system 204 provides a prompt to the large generative image model 240 to generate an image for the user, as shown in act 304. In various implementations, the image generation system 204 may perform various operations on the user's request before providing it to the large generative image model 240. For example, the image generation system 204 and/or the image model protection system 206 run protective measures against the user prompt, which are described further below.

In various implementations, the image generation system 204 modifies, enhances, updates, and/or overwrites the user prompt. For example, the image generation system 204 uses a set of heuristics and/or a large generative model to modify or change the user generative image request to improve the quality of the generative image. For instance, because large generative models often perform better with more verbose prompts, the image generation system 204 ensures that user requests include a minimum number of words before providing the user request in a prompt to the large generative image model 240.

In some implementations, the image generation system 204 adds, embeds, and/or includes a unique randomized token (e.g., a specialized seed) to or with the user request before providing it to the large generative image model 240. For example, the specialized seed is a globally unique identifier (GUID) and/or a unique (statistically unique) string of letters and/or numbers that is included with the user request in the prompt to ensure that the generative image created by the large generative image model 240 is distinctive. In these implementations, even if the user request includes the same prompt, the unique randomized token ensures that the resulting generative images differ from each other, while not impacting the content of the generative image. In some implementations, the unique randomized token is the same as an image identifier assigned to a generative image.

Act 306 includes the large generative image model 240 generating a generative image based on the prompt. In addition, act 306 includes providing the generative image to the client device 260 and the image generation system 204. For example, the image generation system 204 receives the generative image from the large generative image model 240 in response to providing the prompt based on the user request. In some instances, as described below, the image model protection system 206 performs one or more security measures on the generative image to detect harmful generative images. However, in some cases, a harmful image evades detection.

As shown in FIG. 3, act 308 includes generating a digital signature of the generative image. In various implementations, the image model protection system 206 generates a unique token derived from the generative image. The image model protection system 206 uses a digital signature algorithm that is deterministic based on the content of the generative image. For example, the image model protection system 206 uses a hash function or algorithm that generates a hash based on the pixels and values in the generative image. In some implementations, the signature algorithm includes pre-processing an image and/or dividing the image into smaller portions. Additionally, while the digital signature algorithm yields the same output each time it is run on the same image, the algorithm is non-reversible.

In various implementations, the image model protection system 206 generates a digital signature based on a fuzzy hash or a similar hashing function. For example, in some implementations, the image model protection system 206 uses a fuzzy hash in connection with pixel pooling (e.g., reducing the dimensionality of an image while preserving its important features). In some instances, the image model protection system 206 runs multiple fuzzy hashes on different subsets of pixels in a generative image, where the results may be combined (e.g., aggregated) or not combined (e.g., a digital signature of a generative image includes a set of fuzzy hashes). In some implementations, the image model protection system 206 applies different fuzzy hash algorithms having different granularity levels, where a finer granularity is used for more precise matching.

By using a fuzzy hash function or algorithm, the image model protection system 206 allows for some minor changes to occur to an image before the digital signatures of the original image and the modified image do not match. For example, even when an image undergoes minor changes (e.g., cropping, rotating, resizing, color filters, and other similar changes), the image model protection system 206 can still match the modified image to the original image based on their digital signatures, even if they are not exact matches.

As shown, act 310 includes storing the digital signature with other generative image information. In various implementations, the image model protection system 206 stores the digital signature of the generative image along with an image identifier and the grounding information prompt provided to the large generative image model 240. In some instances, the prompt includes the original user generative image request and the modified version of the prompt. The image model protection system 206 may also store additional image information, such as one or more timestamps (e.g., request time, prompt submission time, generative image receipt time), the unique randomized token, large generative image model version, a copy of the generative image (e.g., full-sized, reduced-sized, or a thumbnail), a user identifier of the submitting user, user account details, and/or other image attributes or metadata.

In various implementations, the image model protection system 206 stores some or all of the above information in a single data store, such as a database. In some implementations, the image model protection system 206 stores the generative image information separately, linked by the image identifier. For example, the digital signature (and image identifier) is stored as an entry in a first data store, the prompt (and image identifier) is stored as an entry in a second data store, and the unique randomized token (and image identifier) is stored as an entry in a third data store.

In some instances, the image model protection system 206 generates different versions of digital signatures. For example, the image model protection system 206 generates a public version that is openly attached to the generative image, such as a watermark openly indicating that the large generative image model created the image and when. The image model protection system 206 also generates a private, internal digital signature that it stores and does not share with the public and/or the requesting user.

In connection with storing the digital signatures and prompt of the generative image, the image generation system 204 and/or the image model protection system 206 provide the generative image to the image model protection system 206, as shown in act 312. In some implementations, the image generation system 204 provides multiple generative images in response to a single user generative image request, in which each image has its own digital signature and unique randomized token.

Figure 4:
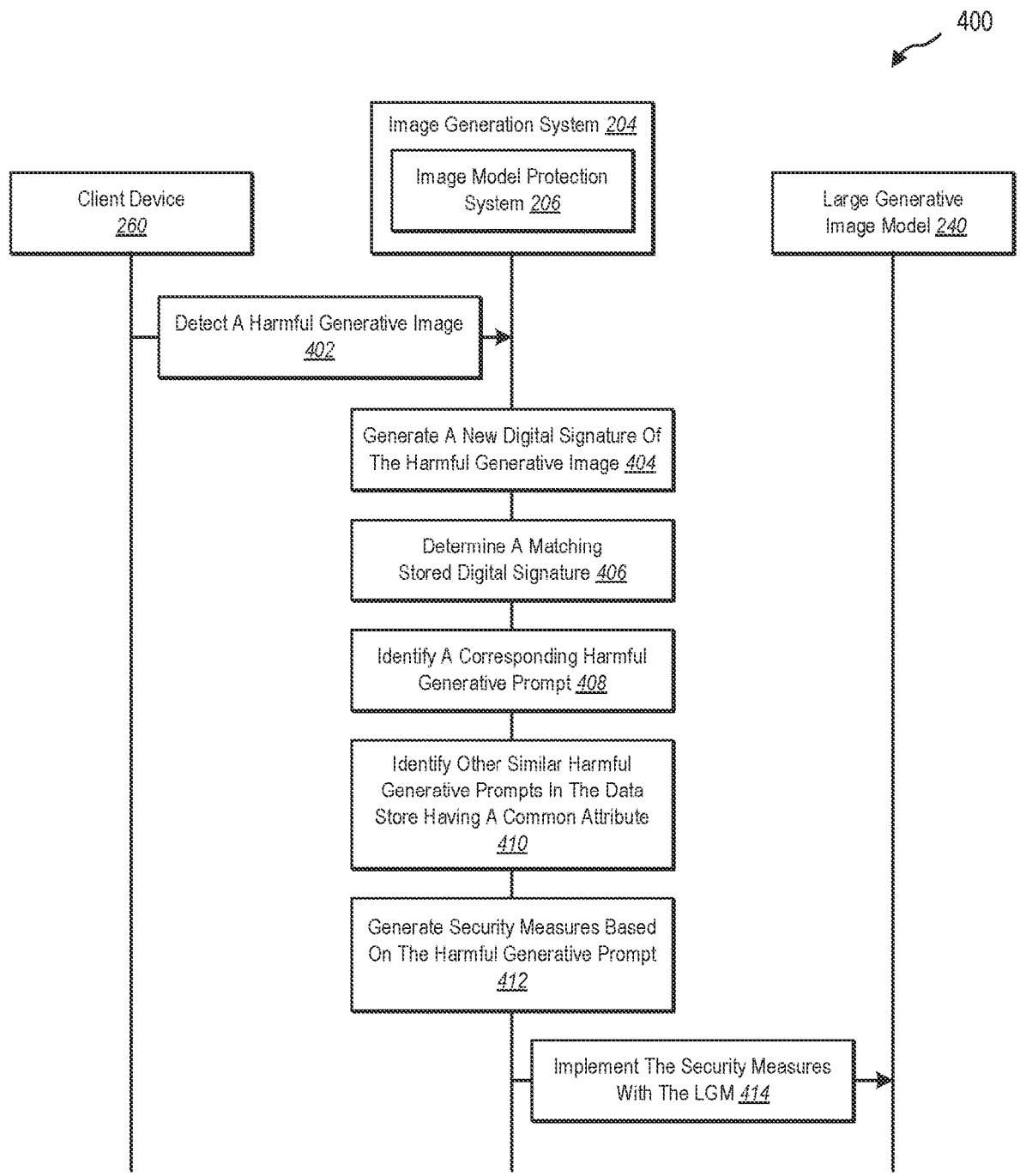
FIG. 4 illustrates an example sequence diagram of identifying a harmful generative image prompt using digital signatures.

While FIG. 3 describes the process of generating a generative image, generating its digital signature, and storing image information, FIG. 4 describes the process of matching a harmful generative image to a generative image previously created by the large generative image model. In particular, FIG. 4 illustrates an example sequence diagram for identifying a harmful generative image prompt using digital signatures.

As shown, FIG. 4 includes various components in communication with each other, including the image generation system 204, the image model protection system 206, the large generative image model 240, and the content management sources 230, each of which is introduced above. FIG. 4 also includes a series of acts 400 performed by or with the image model protection system 206 to detect harmful generative images and use them to improve security measures for the large generative image model 240.

While this disclosure describes harmful images (for example, harmful generative images), the same principles and/or processes apply to non-harmful generative images or potentially harmful images. For example, the image model protection system 206 may use the actions described in this document to determine whether the image generation system 204 generated a specific generative image and/or what prompt was used to generate the image. In addition, this disclosure can be extended to detect and guard against the generation of harmful generative videos and/or generative audio.

Act 402 includes the image model protection system 206 detecting a harmful generative image from one or more of the content management sources 230. For example, a harmful image is posted on a forum or shared on social media. In some instances, the harmful generative image prompt used to generate the harmful image and/or the large generative image model used to create the harmful image is also posted. However, in many cases, this additional information is not posted with the harmful image.

The image model protection system 206 may detect a harmful image in various ways. For example, the image model protection system 206 receives a notification about a harmful generative image, which may be generated by one or multiple large generative image models. After the generative image is received on a client device, it is then provided to one or more of the content management sources 230. When a harmful image is detected on one of the content management sources 230, the image model protection system 206 is notified.

In various instances, the notification may be triggered automatically or provided manually. For example, a social media site or forum flags a post with a harmful image as violating policies and reports the harmful image to the image model protection system 206. In another example, the image model protection system monitors various content management sources for the presence of harmful generative images. In another example, a user posts a harmful image and indicates that it evades the security measures of a large generative image model. In another example, a user indicates that they inadvertently generated a harmful image using a large generative image model.

Act 404 includes the image model protection system 206 generating a new digital signature for the harmful generative image. In various implementations, the image model protection system 206 uses the same digital signature algorithm or function as described above to generate a new digital signature for the harmful image. In some instances, the image model protection system 206 uses a similar, but less (or more) granular version of the digital signature algorithm to generate the new digital signature.

With the new digital signature generated, the image model protection system 206 can determine if the large generative image model 240 generated the harmful image. As shown, act 406 includes determining a matching stored digital signature. For example, the image model protection system 206 compares the new digital signature against stored digital signatures of previous images generated by the large generative image model 240 to determine whether a match exists.

If the image generation system 204 did generate the harmful image and the harmful image is unmodified, then the image model protection system 206 will identify the match by comparing the digital signatures. If the image generation system 204 generated the harmful image, the harmful image is modified below a threshold amount, and the digital signature was generated with a fuzzy hash algorithm, then the image model protection system 206 will identify the match based on the digital signatures. However, if the image generation system 204 generated the harmful image, the harmful image is modified above a threshold amount, and the digital signature was generated with a fuzzy hash algorithm, then the image model protection system 206 may not be able to identify a match. Also, if the image generation system 204 did not generate the harmful image, then the image model protection system 206 will not be able to identify any match.

In various implementations, the image model protection system 206 determines a match by directly comparing the new digital signature to the stored digital signatures. For example, the image model protection system 206 looks up the new digital signature in a table to determine if it is present or performs a simple database search query.

In some implementations, the image model protection system 206 indirectly compares the digital signatures. For example, the image model protection system 206 maps them to a vector space and performs the comparison there. For instance, the stored digital signatures are maintained in an approximate nearest neighbor (ANN) index based on their embeddings, and the image model protection system 206 compares the embedding of the new digital signature (generated with the same embedding model) to the embeddings of stored digital signatures to determine if one of the stored embeddings is within a threshold vector distance, signifying a match. When multiple stored embeddings are within the threshold vector distance, the image model protection system 206 may select the closest embedding or select all of the embeddings.

As mentioned above, in various implementations, the image model protection system 206 adds a unique randomized token to the prompt provided to the large generative image model 240 when creating a generative image. This unique randomized token is beneficial in ensuring a single, accurate match between a harmful image and a stored original generative image, even if the harmful image has been modified.

To illustrate, the unique randomized token causes the large generative image model 240 to generate a distinct generative image (even when the user generative image request is the same between two generative images). The distinctness of the generative image results in a distinct digital signature, which results in a distinct mapping within the vector embedding space. Thus, as each generative image is distinctly located within the vector embedding space, the image model protection system 206 more accurately determines a match. Furthermore, the image model protection system 206 allows for the original harmful image to be modified and still match due to other generative images with the same or similar user request, which may be located far from each other in the vector embedding space because of their unique randomized tokens (e.g., the threshold vector distance can be relaxed when unique randomized tokens are used while maintaining accurate matches).

Act 408 shows the image model protection system 206 identifying a corresponding harmful generative prompt. Once a match is determined between the harmful image and the previously created generative image based on their digital signatures, the image model protection system 206 identifies the prompt (i.e., the harmful generative prompt) used to generate the harmful image. In some cases, the matching stored digital signature and the harmful generative prompt are stored in the same data store. In some instances, the image model protection system 206 uses the image identifier associated with the matching stored digital signature from one data store to identify the harmful generative prompt located in another data store. Using the image identifier, the image model protection system 206 may locate other information (e.g., the user generative image request, prompt modifications, timestamps, user identifier) associated with the matching stored digital signature corresponding to the matching generative image from the same or different data stores.

As shown, FIG. 4 includes act 410 of identifying other similar harmful generative prompts in the data store that have a common attribute. For example, the image model protection system 206 determines whether the harmful generative prompt is related to other harmful generative prompts (or attempts at being a harmful generative prompt). For instance, the image model protection system 206 identifies other prompts within a time range of the harmful generative prompt. The image model protection system 206 may choose not to perform this action in certain cases.

Another example is that the image model protection system 206 identifies the user identifier of the harmful generative prompt and searches for other prompts to determine if they are also harmful generative prompts. For instance, a bad actor may submit multiple harmful generative prompts around the same time, which the image model protection system 206 can detect from common attributes in the one harmful generative prompt and other prompts in the stored information.

In various implementations, the image model protection system 206 compares the language in the matching harmful generative prompt to other stored generative prompts to determine overlapping content. In some instances, the image model protection system 206 identifies similar prompts within the vector embedding space and determines if those generative images have similar harmful generative prompts.

As mentioned earlier, in some implementations, the image model protection system 206 stores information for a harmful generative image across different entries in different data stores (each associated with corresponding image identifiers). In these instances, the image model protection system 206 may identify an attribute within an entry in one data store where the entry includes the harmful generative image prompt. In addition, the image model protection system 206 determines an additional entry with the same or different data store that includes the common attribute. Furthermore, the image model protection system 206 determines that the additional entry includes an additional harmful generative image prompt. In some implementations, the additional entry is within a threshold time period of the entry, and/or the attribute is a user identifier.

Act 412 includes the image model protection system 206 generating security measures based on the harmful generative prompt (or prompts if act 410 yields additional harmful generative prompts). For example, the image model protection system 206 uses the harmful generative prompt to generate and/or modify one or more security measures to apply to the large generative image model 240 to prevent the same or similar harmful generative prompts from attacking the model.

Act 414 includes the image model protection system 206 implementing the security measures with the large generative image model. For instance, the image model protection system 206 implements security measures to improve responsible artificial intelligence safeguards of the large generative image model. Additional details regarding the improvement of the security of the large generative image model using robustness measures are provided below in connection with FIG. 6.

Figure 5:
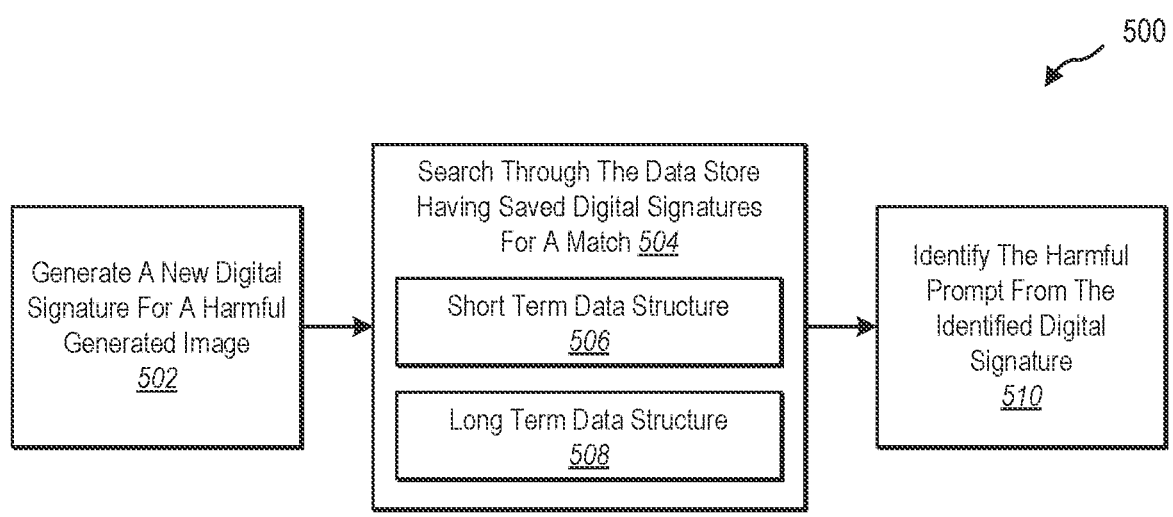
FIG. 5 illustrates an example diagram of searching for a generative image that matches a harmful image generated by the large generative image model.

FIG. 5 shows an example of determining a match between a harmful generative image and a previously created generative image using digital signatures. In particular, FIG. 5 illustrates an example diagram of searching for a generative image that matches a harmful image generated by the large generative image model according to some implementations. As shown, FIG. 5 includes a series of acts 500 performed by or with the image model protection system 206 for detecting harmful generative images generated by a particular large generative image model.

As shown, the series of acts 500 includes act 502 of generating a new digital signature for a harmful generative image. As mentioned above, the image model protection system 206 may use a digital signature algorithm that deterministically generates a digital signature based on the content of the harmful image. In some instances, the digital signature algorithm is a fuzzy hash function.

Act 504 includes searching through the data store having saved digital signatures (i.e., stored digital signatures) for a match. As shown, the image model protection system 206 may search through a short-term data structure 506 or a long-term data structure 508. For context, the image generation system may generate thousands, millions, or billions of generative images over a short period of time (e.g., within a few months). Because of these enormous amounts of data, simple searching or queries to determine a match become infeasible. Rather, the data must be stored in a well-organized structure to be efficiently located, which takes a non-trivial amount of time to reorganize as new data is received.

In some instances, the image model protection system 206 achieves an organized data structure by using the short-term data structure 506 and the long-term data structure 508. For example, the short-term data structure 506 may be a list that can be quickly searched linearly and the long-term data structure 508 is an ANN index that is regularly indexed and/or rebuilt (e.g., hourly, daily, weekly, monthly), to add the new data in the short-term data structure 506. For instance, the ANN index includes a tree-like hierarchy that enables a faster, more efficient search. In some implementations, the short-term data structure 506 is a small ANN index that can be re-indexed and/or rebuilt each time one or more new pieces of data arrive.

In various implementations, the image model protection system 206 employs different types of data stores and/or a different number of data structures. For example, the image model protection system 206 may have other types of data structures that allow for quick and efficient identification of stored digital signatures given a sample harmful generative image.

Act 510 includes the image model protection system 206 identifying the harmful generative prompt from the identified digital signature. For example, using an index lookup, embedding matching, or another approach, the image model protection system 206 initially identifies the matching generative image (e.g., based on the image identifier). After, the image model protection system 206 identifies that the harmful generative prompt was used to cause the large generative image model to generate the harmful image, as described above.

Figure 6:
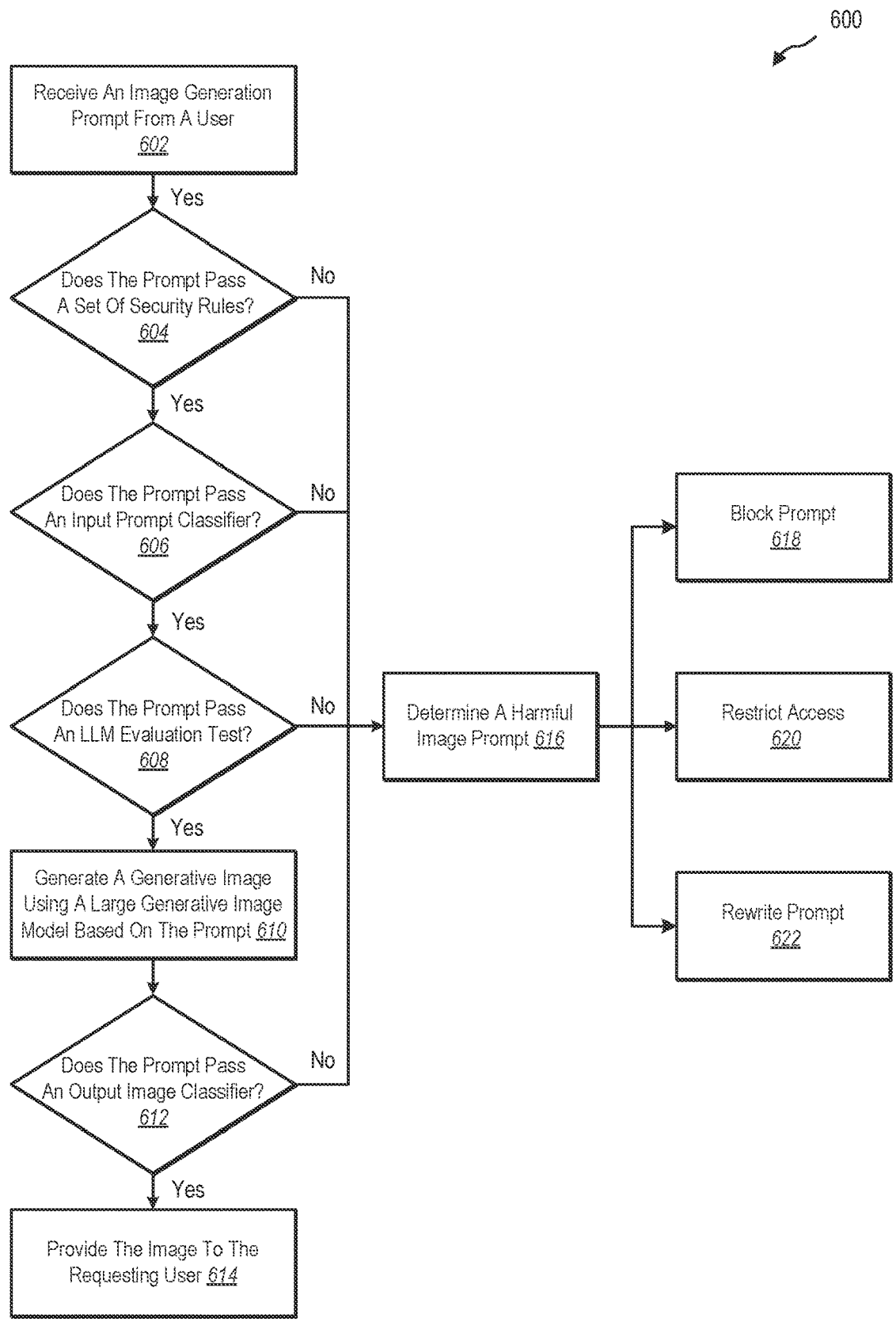
FIG. 6 illustrates an example diagram of improving the security of a large generative image model based on harmful image prompts.

As mentioned above, FIG. 6 provides additional details regarding the implementation of protective security measures for a large generative image model. In particular, FIG. 6 illustrates an example diagram of improving the security of a large generative image model based on harmful image prompts. As shown, FIG. 6 includes a series of acts 600 performed by or with the image model protection system 206 to implement protective security measures to prevent the large generative image model from generating harmful generative images based on the harmful generative image prompt.

The series of acts 600 begins with act 602 of the image model protection system 206 receiving an image generation prompt from a user. In many instances, the image generation prompt (prompt) is non-harmful and non-malicious. However, in some instances, the prompt is a harmful generation prompt.

Based on receiving the prompt, the image model protection system 206 determines whether the prompt passes a set of security rules, as shown in act 604. For example, the image model protection system 206 determines, checks, or verifies whether the prompt includes terms on an exclusion list. In some implementations, the set of security rules is based on previously detected harmful prompts. For instance, the image model protection system 206 generates a new rule and/or modifies an existing rule when a harmful prompt is identified, such as adding words or phrases from the harmful prompt to a rule to detect prompts that include those words or phrases.

Act 606 includes determining whether the prompt passes an input prompt classifier. For example, the image model protection system 206 provides an input prompt classifier algorithm or function that categorizes a prompt as harmful or non-harmful. In some instances, the input prompt classifier is a machine-learning model. For example, the image model protection system 206 fine-tunes the input prompt classifier based on identified harmful prompts to detect future similar prompts provided to the large generative image model. In some instances, the input prompt classifier is a text-based classifier that processes the text-based prompt provided as input to the large generative image model.

As shown, act 608 includes determining whether the prompt passes an LLM evaluation test. For example, the image model protection system 206 provides a system prompt to the LLM for evaluation and determines whether the accompanying user prompt is harmful or non-harmful. In various instances, the system prompt includes one or more examples of harmful prompts based on previously detected harmful prompts.

If the image model protection system 206 determines that the prompt does not pass any of acts 604-608, then the image model protection system 206 determines that the prompt is a harmful generative prompt, which is shown in act 616. Otherwise, the image model protection system 206 allows the large generative image model to create a generative image based on the prompt, as shown in act 610.

Act 612 includes determining whether the generative image prompt passes an output image classifier. For example, the image model protection system 206 provides an output image classifier algorithm or function that categorizes a generative image as either harmful or non-harmful. In some cases, the output image classifier is a machine-learning model that is fine-tuned using harmful generative images generated from identified harmful prompts. If the generative image is classified as harmful (e.g., a harmful image), then the image model protection system 206 proceeds to act 616, which involves determining that the prompt corresponding to the generative image is a harmful generative prompt.

Otherwise, if the generative image is not classified as a harmful image, the image model protection system 206 and/or the image generation system can provide the generative image to the requesting user via a client device. Indeed, if the prompt and the corresponding generative image pass each of the security measures applied in connection with the large generative image model, the image model protection system 206 allows the generative image to be provided to the requesting user, as shown in act 614.

As mentioned, in various implementations, the image model protection system 206 determines that a prompt is a harmful generative prompt (e.g., act 616). Based on detecting a harmful prompt, the image model protection system 206 may perform one or more mitigating actions in addition to using the harmful prompt to implement further security measures in connection with the large generative image model.

To illustrate, act 618 shows the image model protection system 206 blocking the prompt. For example, the image model protection system 206 rejects, drops, or cancels the prompt request of a harmful prompt. In some instances, the image model protection system 206 provides a notification to the client device regarding the blocked content request, as shown in the next figure.

Act 620 includes the image model protection system 206 restricting access. For instance, the image model protection system 206 limits or restricts a user identifier's access to the image generation model or large generative image model for a period of time. This may involve placing an account on probation or suspension. In some implementations, if the image model protection system 206 determines that a user identifier has submitted multiple harmful prompts, it may ban or block the user from making future user generative image requests.

Act 622 includes rewriting the harmful prompt. For example, the image model protection system 206 rewrites the harmful prompt into a non-harmful version before providing the modified prompt to the large generative image model. For instance, the image model protection system 206 may remove the harmful aspects of the prompt (e.g., creating a sanitized version). In some instances, the image model protection system 206 determines a non-harmful creation intent of the harmful prompt and edits and/or re-writes a new prompt that conveys the intent in a non-harmful way. In various instances, the image model protection system 206 employs an LLM or other large generative model to generate a non-harmful prompt from the harmful prompt.

Figure 7:
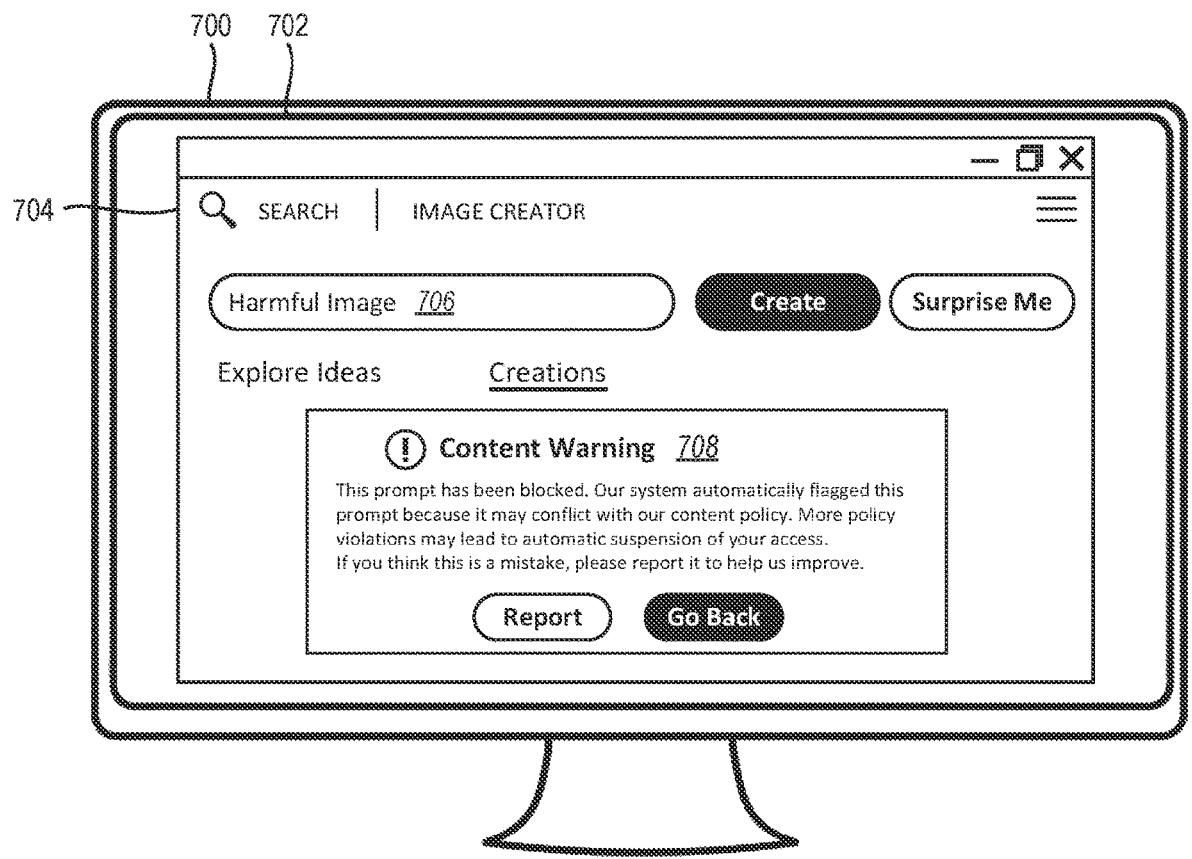
FIG. 7 illustrates an example graphical user interface of blocking a harmful prompt.

FIG. 7 illustrates an example graphical user interface of blocking a harmful prompt. As shown, FIG. 7 includes a client device 700 with a graphical user interface 702 and client application 704. The client application 704 allows a user to interact with the image generation system to generate images.

To illustrate, a user provides the user generative image request 706 of "harmful image." In response, the image model protection system 206 determines that the user request is a harmful prompt. As shown, the image model protection system 206 further responds by blocking the request and providing a notification 708 to the client device 700 indicating that the request has been stopped. While FIG.

7 provides one example of the image model protection system 206 detecting and responding to a harmful prompt, there are many other examples.

Figure 8:
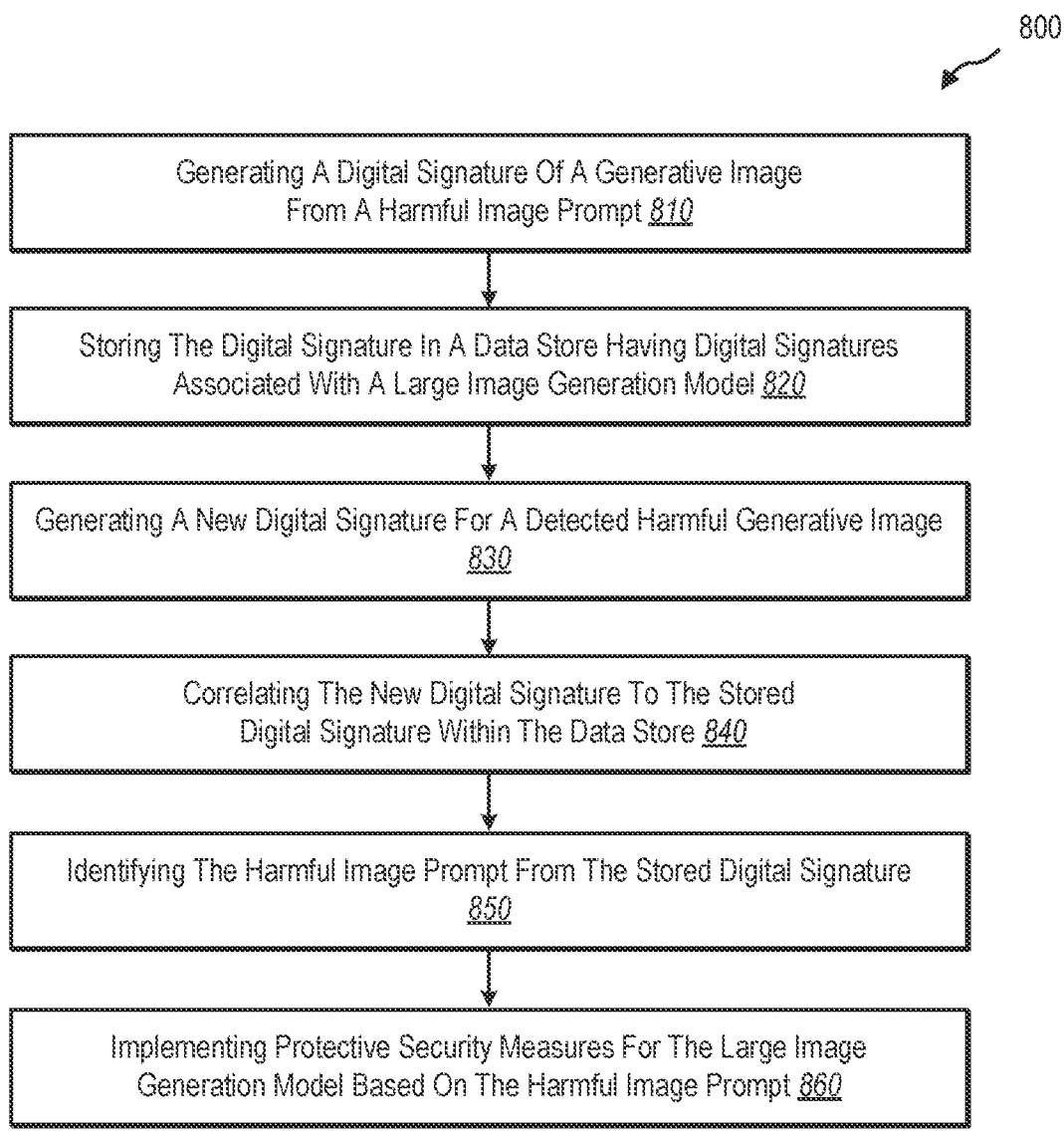
FIG. 8 illustrates an example series of acts of a computer-implemented method for protecting against harmful generative image prompts on large generative image models.

Turning now to FIG. 8, this figure illustrates an example series of acts of a computer-implemented method for protecting against one or more harmful generative image prompts on one or more large generative image models according to some implementations. While FIG. 8 illustrates acts according to one or more implementations, alternative implementations may omit, add to, reorder, and/or modify any of the acts shown.

The acts in FIG. 8 can be performed as part of a method (e.g., a computer-implemented method). Alternatively, a computer-readable medium can include instructions that, when executed by a processing system with a processor, cause a computing device to perform the acts in FIG. 8. In some implementations, a system (e.g., a processing system comprising a processor) can perform the acts in FIG. 8. For example, the system includes a processing system and a computer memory including instructions that, when executed by the processing system, cause the system to perform various actions or steps.

As shown, the series of acts 800 includes act 810 of generating a digital signature of a generative image from a harmful image prompt. For instance, in example implementations, act 810 involves generating a digital signature for a generative image generated or created by a large generative image model based on a generative image prompt (e.g., a harmful generative image prompt). In some instances, act 810 includes combining a user image generation request with a unique randomized token to generate a generative image prompt and/or providing the generative image prompt to the large generative image model to generate the generative image.

As further shown, the series of acts 800 includes act 820 of storing the digital signature in a data store having digital signatures associated with a large generative image model. For instance, in example implementations, act 820 involves storing the digital signature as a stored digital signature in a data store having stored digital signatures associated with images generated by the large generative image model. In some implementations, act 820 includes storing the digital signature, the generative image prompt, and/or an image identifier for the generative image in the data store. In some instances, act 820 also includes storing a creation timestamp, an image thumbnail of the generative image, and/or a user identifier with the image identifier.

As further shown, the series of acts 800 includes act 830 of generating a new digital signature for a detected harmful generative image. For instance, in example implementations, act 830 involves generating a new digital signature for the harmful generative image based on identifying a harmful generative image. In some instances, act 830 includes generating the stored digital signature for a generative image and the new digital signature for the harmful generative image using a fuzzy hash algorithm.

As shown further, the series of acts 800 includes act 840 of correlating the new digital signature with the stored digital signature within the data store. For instance, in example implementations, act 840 involves determining that the large generative image model generated the harmful generative image by correlating the new digital signature with or to the stored digital signature within the data store.

In some instances, act 840 includes identifying an attribute within an entry in the data store where the entry includes the generative image prompt, determining an additional entry within the data store that includes the attribute, and determining that the additional entry includes an additional generative image prompt. In some instances, the additional entry is within a threshold time period of the entry. In some instances, the attribute is a user identifier. In some instances, act 840 includes correlating the new digital signature with the stored digital signature within the data store by identifying the stored digital signature as the closest match to the new digital signature within the data store and/or determining that a new embedding for the new digital signature is within an embedding distance threshold of an embedding for the stored digital signature.

As further shown, the series of acts 800 includes act 850 of identifying the harmful image prompt from the stored digital signature. For instance, in example implementations, act 850 involves identifying the generative image prompt within the data store based on the stored digital signature. In some instances, act 850 includes (or is replaced by) identifying a generative image prompt associated with the stored digital signature within the data store. In some instances, act 850 includes identifying the generative image prompt within the data store by identifying an image identifier associated with the stored digital signature and identifying the generative image prompt associated with the image identifier. In some instances, the stored digital signature and the generative image prompt are stored in different entries and data structures within the data store.

As further shown, the series of acts 800 includes act 860 of implementing protective security measures for the large generative image model based on the harmful image prompt. For instance, in example implementations, act 860 involves implementing protective security measures to prevent the large generative image model from generating harmful images (e.g., harmful generative images) based on the generative image prompt.

In some instances, act 860 includes (or is replaced by) implementing protective security measures to prevent the large generative image model from generating harmful images based on the generative image prompt. In some instances, act 860 includes (or is replaced by) implementing protective security measures for the large generative image model based on the generative image prompt. In some instances, act 860 includes implementing the protective security measures by modifying a prompt input classifier for the large generative image model based on the generative image prompt and/or using the prompt input classifier to detect a new generative image prompt as a harmful generative image prompt. In some instances, act 860 includes implementing protective security measures by modifying an image output classifier for the large generative image model based on the generative image prompt and/or using the image output classifier to detect a new generative image as harmful (e.g., a harmful image).

In some instances, act 860 includes implementing protective security measures by updating a large language model based on the generative image prompt and/or using the large language model to detect a new generative image prompt a harmful generative image prompt. In some instances, act 860 includes implementing protective security measures by determining a word or a phrase within the generative image prompt and/or modifying a rule set to detect the word or the phrase in a new generative image prompt for the large generative image model. In some instances, act 860 includes implementing protective security measures by determining a word or a phrase within the generative image prompt and/or modifying a rule set to detect the word or the phrase in a generative image prompt for the large generative image model.

In some instances, act 860 includes detecting a new generative image prompt for the large generative image model based on or using the protective security measures implemented and rewriting the new generative image prompt into a non-harmful generative image prompt. In some instances, act 860 includes detecting a new generative image prompt for the large generative image model based on or using the protective security measures implemented and blocking the new generative image prompt from being provided to the large generative image model.

Figure 9:
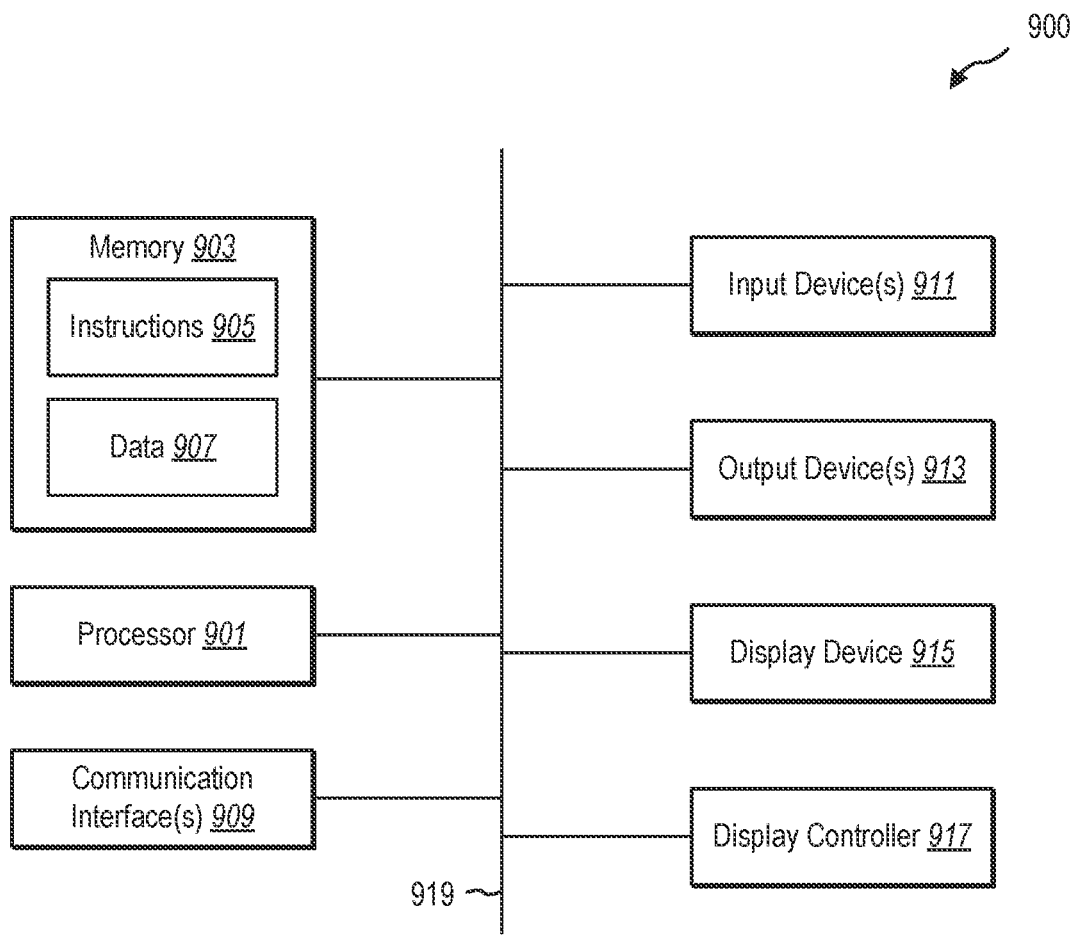
FIG. 9 illustrates example components included within a computer system used to implement the image model protection system.

FIG. 9 illustrates certain components that may be included within a computer system 900. The computer system 900 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates according to an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for protecting against one or more harmful generative image prompts on one or more large generative image models, comprising:
    generating a digital signature for a generative image generated by a large generative image model based on a generative image prompt;
    storing the digital signature as a stored digital signature in a data store comprising stored digital signatures associated with images generated by the large generative image model;
    based on identifying a harmful image, generating a new digital signature for the harmful image;
    determining that the large generative image model generated the harmful image by correlating the new digital signature with the stored digital signature within the data store;

identifying the generative image prompt within the data store based on the stored digital signature; and implementing protective security measures to prevent the large generative image model from generating harmful images based on the generative image prompt.

2. The computer-implemented method of claim 1, wherein implementing the protective security measures includes:

modifying a prompt input classifier for the large generative image model based on the generative image prompt; and the computer-implemented method further comprising using the prompt input classifier to detect a new generative image prompt as a harmful generative image prompt.

3. The computer-implemented method of claim 1, wherein implementing the protective security measures includes:

modifying an image output classifier for the large generative image model based on the generative image prompt; and the computer-implemented method further comprising using the image output classifier to detect a new generative image as harmful.

4. The computer-implemented method of claim 1, wherein implementing the protective security measures includes:

updating a large language model based on the generative image prompt; and the computer-implemented method further comprising using the large language model to detect a new generative image prompt a harmful generative image prompt.

5. The computer-implemented method of claim 1, wherein implementing the protective security measures includes:

determining a word or a phrase within the generative image prompt; and modifying a rule set to detect the word or the phrase in a new generative image prompt for the large generative image model.

6. The computer-implemented method of claim 1, further comprising:

detecting a new generative image prompt for the large generative image model using the protective security measures implemented; and rewriting the new generative image prompt into a non-harmful generative image prompt.

7. The computer-implemented method of claim 1, further comprising:

detecting a new generative image prompt for the large generative image model using the protective security measures implemented; and blocking the new generative image prompt from being provided to the large generative image model.

8. The computer-implemented method of claim 1, further comprising:

identifying an attribute within an entry in the data store where the entry includes the generative image prompt;

determining an additional entry within the data store that includes the attribute; and determining that the additional entry includes an additional generative image prompt.

9. The computer-implemented method of claim 8, wherein the additional entry is within a threshold time period of the entry.

10. The computer-implemented method of claim 9, wherein the attribute is a user identifier.

11. The computer-implemented method of claim 1, further comprising:

combining a user image generation request with a unique randomized token to generate the generative image prompt; and providing the generative image prompt to the large generative image model to generate the generative image.

12. The computer-implemented method of claim 1, further comprising storing the digital signature, the generative image prompt, and an image identifier for the generative image in the data store.

13. The computer-implemented method of claim 12, further comprising storing a creation timestamp, an image thumbnail of the generative image, and a user identifier with the image identifier.

14. A computer-implemented method for protecting against one or more harmful generative image prompts on one or more large generative image models, comprising:

based on identifying a harmful image, generating a new digital signature for the harmful image;

determining that a large generative image model generated the harmful image by correlating the new digital signature with a stored digital signature within a data store having stored digital signatures associated with images generated by the large generative image model;

identifying a generative image prompt associated with the stored digital signature within the data store; and implementing protective security measures to prevent the large generative image model from generating harmful images based on the generative image prompt.

15. The computer-implemented method of claim 14, further comprising generating the stored digital signature for a generative image and the new digital signature for the harmful image using a fuzzy hash algorithm.

16. The computer-implemented method of claim 14, wherein correlating the new digital signature with the stored digital signature within the data store includes identifying the stored digital signature as a closest match to the new digital signature within the data store.

17. The computer-implemented method of claim 14, wherein correlating the new digital signature with the stored digital signature within the data store includes determining that a new embedding for the new digital signature is within an embedding distance threshold of an embedding for the stored digital signature.

18. The computer-implemented method of claim 14, further comprising identifying the generative image prompt within the data store by:

identifying an image identifier associated with the stored digital signature; and identifying the generative image prompt associated with the image identifier, wherein the stored digital signature and the generative image prompt are stored in different entries and data structures within the data store.

19. A system for protecting against generating one or more harmful generative images, comprising:

a processing system; and a computer memory comprising instructions that, when executed by the processing system, cause the system to perform operations of:

based on identifying a harmful image, generating a new digital signature for the harmful image;

determining that a large generative image model generated the harmful image by correlating the new digital signature with a stored digital signature within a data store having stored digital signatures associated with images generated by the large generative image model;

identifying a generative image prompt associated with the stored digital signature within the data store; and implementing protective security measures for the large generative image model based on the generative image prompt.

20. The system of claim 19, wherein the operations further comprise:

generating a digital signature from a generative image generated by the large generative image model based on the generative image prompt;

storing the digital signature as the stored digital signature and the generative image prompt in the data store; and identifying the harmful image based on detecting harmful images on one or more content management sources.

\* \* \* \* \*